United States Patent Office 3,019,307
Patented Jan. 30, 1962

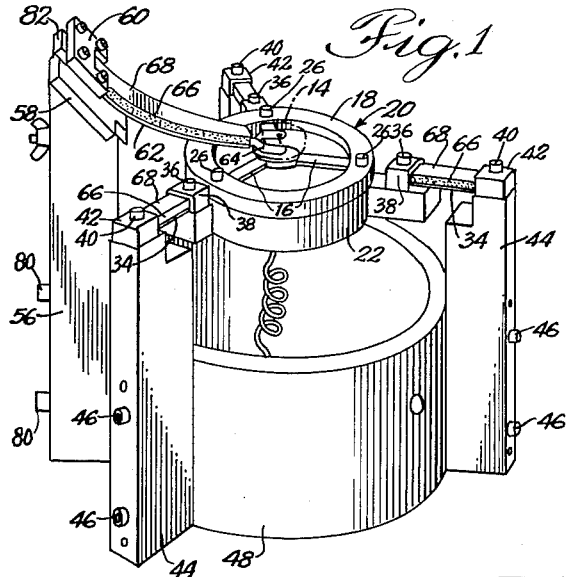

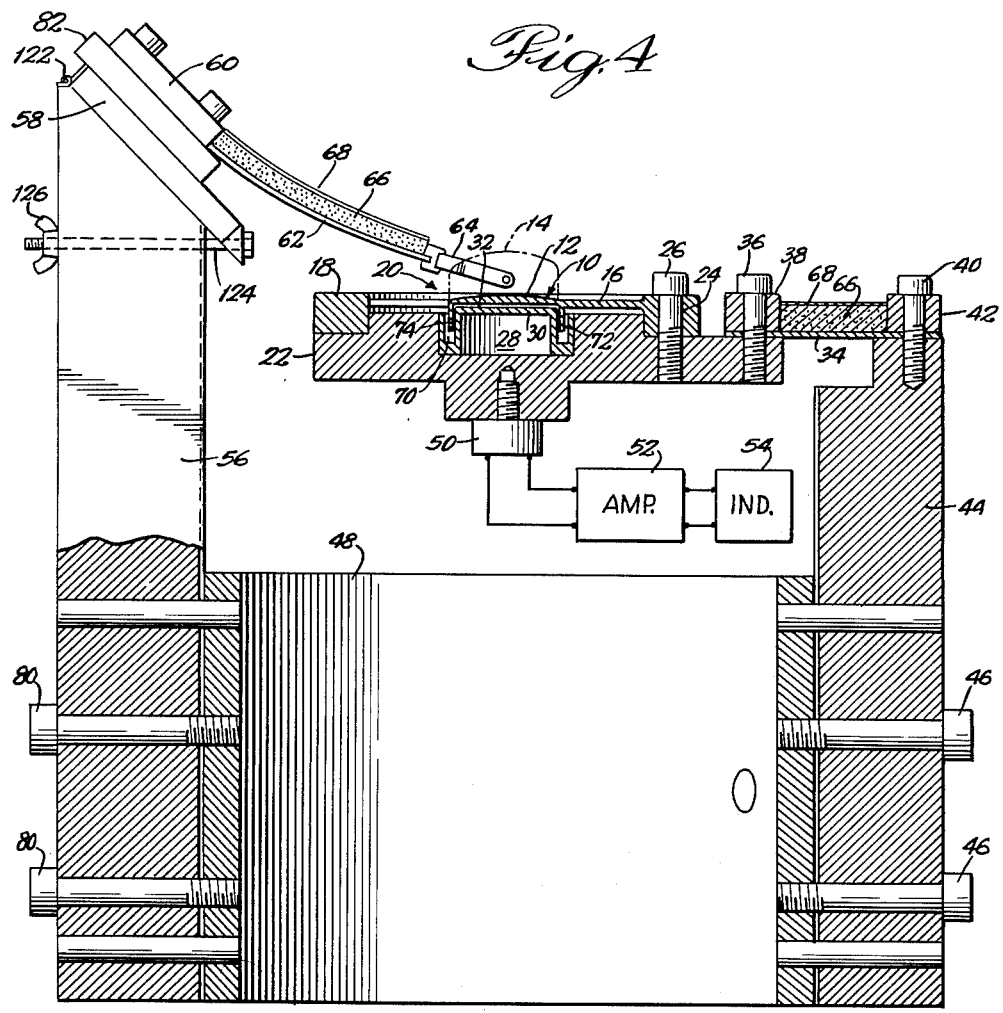

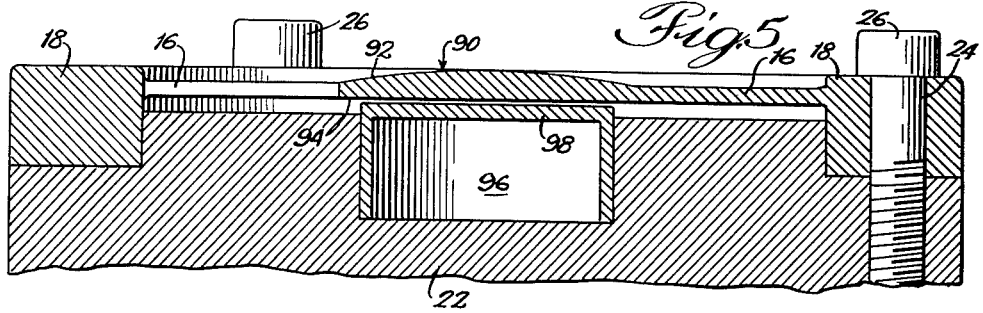
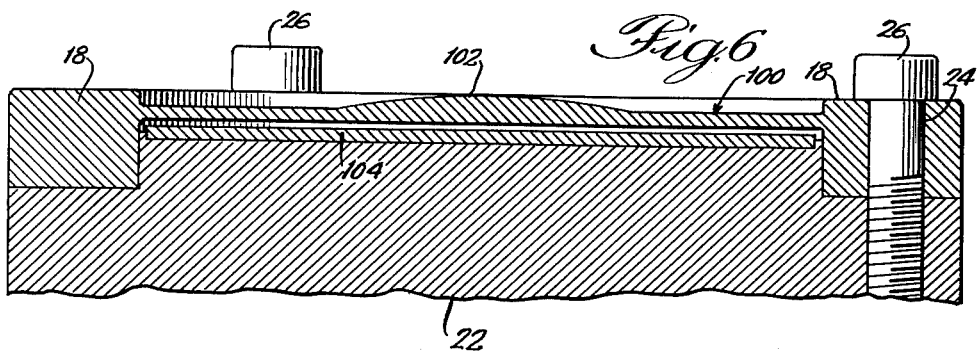
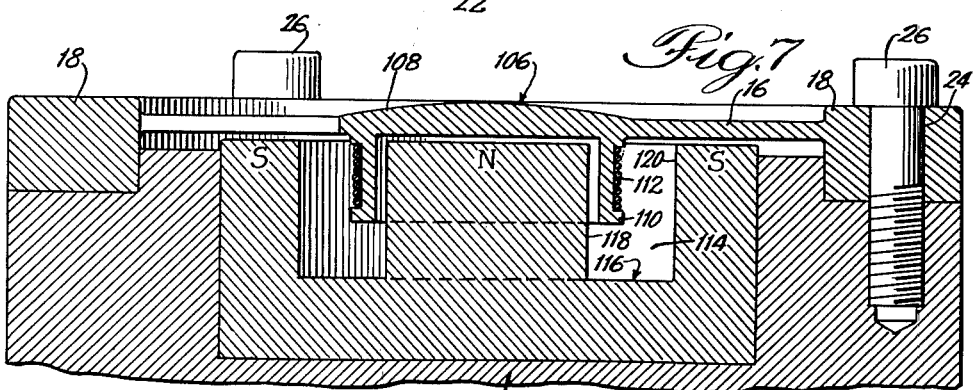
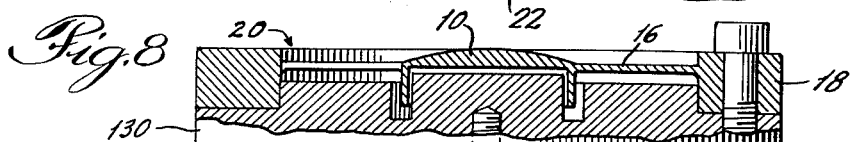

3,019,307
ARTIFICIAL MASTOID
Erwin M. Weiss, Chicago, Ill., assignor to
Beltone Hearing Aid Company
Filed Feb. 15, 1960, Ser. No. 8,556
17 Claims. (Cl. 179—175.1)

This invention relates generally to measuring and testing devices for hearing aids, and more particularly to new and improved apparatus for measuring and testing hearing aids of the bone conduction type and for calibrating diagnostic instruments used for the measurement of bone conductive hearing loss.

Those skilled in the hearing aid arts are familiar with a long-existing need for a reproducible standard capable of measuring the response of a bone conduction receiver. Efficient apparatus has been developed for the measurement of air conduction hearing aid devices—for example, the standard two cc. coupler used for measuring insert type phones and the six cc. coupler used for measuring earphones with cushions—but to date no comparable standard has been known for bone conduction hearing aid devices.

Prior art attempts to provide a bone conduction standard have not proved satisfactory. Manifestly, to measure the performance of the bone receiver, it is important that the measuring apparatus accurately simulates the dynamic impedance characteristics of the portion of the body at which the bone receiver is positioned. While there are many body areas capable of operatively receiving a bone conduction receiver for a hearing aid, such as the mastoid and the forehead of the hard-of-hearing person, for purposes of explanation, the invention will be described hereafter as adapted to simulate the mastoid—and therefore, this illustrative embodiment of the invention can be termed an artificial mastoid.

Further, there has been the problem of reproducibility of the measuring apparatus to the end that test results may be reproduced from one laboratory to another, and that comparison figures for the performance of bone receivers may have some useful meaning attached thereto. Generally, the prior art devices for measuring the performance characteristics of bone receivers use the compliance of a sheet of rubber. Since visco-elastic materials, such as rubber, vary considerably from batch to batch, and also is variable with temperature and humidity conditions, apparently similar measuring devices actually have been found to behave differently from time to time, and from place to place, with the result that an accurate, reproducible standard for measuring bone conduction receivers has not been known to the date of the present invention.

Accordingly, it is a general object of this invention to provide a reproducible standard for bone receiver measurements and for calibrating diagnostic instruments used for measurement of bone conductive hearing loss.

More specifically, it is one object of this invention to provide a reproducible artificial mastoid for accurately testing bone conduction hearing aid apparatus and for measuring performance characteristics thereof.

In accordance with a feature of this invention, the artificial mastoid comprises a multi-element mechano-acoustic system adapted to present to the bone conduction receiver an impedance corresponding to the impedance seen by the receiver when it is placed on the head of the hard-of-hearing person. In one illustrative embodiment of the invention, the artificial mastoid comprises a central disk, formed of magnesium or the like, to which the bone receiver is applied since its mass is representative of the section of skin and bone normally vibrated by the bone receiver, a piston, which advantageously, also is formed of magnesium or the like, spaced from the central disk to define a fluid containing clearance therebetween. The viscous damping loss which occurs in the skin is introduced by the damping action of the fluid within the clearance when the central disk is vibrated by the action of the bone receiver thereon. As explained in greater detail hereinbelow, the configuration of the central disk, piston and the clearance therebetween advantageously may take several forms within the teachings of the invention and still provide accurate measurement of the bone conduction receiver.

In the simulation of the mastoid effected by the illustrative embodiment of the invention, the compliance or springiness of the skin is represented by the action of a plurality of support beams for the central disk. Alternatively, disk compliance or springiness of the skin could be simulated by extending the central disk radially to obtain an enlarged disk having its outer edges clamped to a suitable support. Other forms of a central disk and support means therefor are contemplated within the principles of the invention, the salient features being the use of elements having constant compliance, since the use of reproducible elements enables the reproduction of the invention with great accuracy.

In addition, this illustrative embodiment of the invention comprises a relatively large metal block, such as stainless steel, which supports the piston and which simulates the equivalent mass of the skull, as seen by a bone receiver vibrator when applied to the head of the hard-of-hearing person. Advantageously, an accelerometer or some equivalent measuring device is mounted in the metal block and its electrical output is connected to a suitable amplifying and indicating circuit. The metal block is supported by suitable resilient spring means in spaced relation to the main base structure for the artificial mastoid such that the fluid filled clearance between the metal block and the main base structure is representative of the losses in the bone, i.e., the frictional effects or viscous damping there present.

Thus, it is another object of this invention to provide a reproducible standard for bone conduction receiver measurements which simulate the characteristics of the mastoid upon which the vibratable receiver is positioned during the operation of the bone conduction hearing aid.

It is still another object of this invention to provide such a standard, as above, which is formed of elements having constant compliance, constant viscous damping, and constant effective mass to permit reproduction of the invention with great accuracy.

It is a further object of this invention to provide a reproducible standard for bone conduction receiver measurement having a fluid containing clearance defined between a pair of magnesium elements—one element supporting the vibratable bone receiver and the other element secured to a support for an accelerometer or other force measuring device—for providing a damping action corresponding to the damping properties of the skin.

In accordance with a feature of another illustrative embodiment of the invention, the element which receives the vibratable bone conduction receiver is provided with a conductive member and the opposing element supporting the accelerometer is provided with a permanent magnet assembly. In this embodiment, the necessary damping is provided by the action of a moving conductor in a steady state magnetic field.

Thus, it is a still further feature of this invention to provide a reproducible standard for bone conduction receiver measurement which utilizes magnetic damping action to simulate the damping properties of the skin.

It is a still further object of this invention to provide means for measuring the performance characteristics of a bone conduction hearing aid which is characterized by its accuracy and reliability, its reproducibility, and its relatively simple and economic construction.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

FIGURE 1 is a perspective view of one illustrative embodiment of the invention;

FIGURE 2 is a schematic diagram of the electrical equivalent circuit of the invention;

FIGURE 3 is a top plan view of an illustrative embodiment of the invention as shown in FIGURE 1;

FIGURE 4 is a view, partly in cross-section taken along line 4—4 of FIGURE 3;

FIGURE 5 is an enlarged view, in cross-section of one alternative embodiment of the invention which utilizes a beam supported central disk having no cylindrical flange and in air damping relation to a piston member;

FIGURE 6 is an enlarged view, in cross-section, of another alternative embodiment of the invention which utilizes an enlarged central disk having no cylindrical flange and in air damping relation to an enlarged piston member of substantially the same radial dimensions;

FIGURE 7 is an enlarged view, in cross-section, of still another embodiment of the invention which utilizes a beam supported central disk having a conductive cylindrical flange in magnetic damping relation to a magnetic piston member; and FIGURE 8 is an elevational view, partly broken and in cross-section, of still another embodiment of the invention in which the central disk and piston member assembly are supported by a metal beam having a strain gauge associated therewith.

Referring now to the drawing, and more particularly to FIGURES 1, 3, and 4, there is shown one illustrative embodiment of the invention comprising a reproducible measuring and testing device which is adapted to accurately and reliably simulate the impedance characteristics presented to a vibratable bone conduction receiver when it is positioned on the head of a hard-of-hearing person during the normal use thereof. While, as readily understood by those skilled in the art, there are many areas against which a bone conduction receiver may operatively be applied, such as the mastoid or forehead, for purposes of illustration, the invention will be described as particularly adapted for use in making mastoid measurements of a bone conduction receiver.

An electrical equivalent circuit diagram of the average mastoid impedance characteristics is shown in FIGURE 2 of the drawing. This equivalent circuit is the result of work done at the National Bureau of Standards in determining the average impedance characteristics of the head, and is described in greater detail in an article by Edyth Corliss in the Journal of the Acoustical Society for November 1955 and in the records of a meeting of the Acoustical Society held in May 1958.

Briefly, this electrical equivalent circuit of the impedance presented to a bone conduction receiver operatively positioned on the head of a person comprises an inductor, $m$, which represents the mass of the section of skin and bone vibrated by the bone conduction receiver. Connected with the inductor $m$, is a series circuit comprising a resistor, $r$, which represents the viscous damping loss that occurs in the skin, and a capacitor, $1/k$, which is representative of the compliance or springiness of the skin. In parallel relation with the resistor $r$ and capacitor $1/k$ is a series circuit comprising the resistor, $R$, which represents the frictional or viscous damping losses that occur in the bone, and an inductor, $M$, which represents the mass of the skull as seen by the vibrating bone conduction receiver. Thus, if a force F is applied to the head by means of a vibrating bone conduction receiver, the effective impedance seen by the receiver is represented by the electrical equivalent circuit of FIGURE 2.

Attempts have been made in the prior art to simulate this impedance to the end that the characteristics of bone conduction receivers may be measured for purposes of test, quality control, comparison and the like. These prior art attempts to simulate the impedance represented by the electrical equivalent circuit of FIGURE 2 have not been satisfactory in that the elements used to simulate the impedance have not been reliable or reproducible. Thus, the known prior art devices depend for their properties upon substances such as rubber which vary considerably from batch to batch and with changing temperature and humidity conditions. Accordingly, not only will a particular prior art device vary in its characteristics from time to time, but in addition, comparisons between tests made on different ones of the prior art devices have little or no meaning since it is unlikely that the characteristics of the prior art devices will be identical.

In accordance with a feature of this invention, these prior art difficulties have been obviated by the provision of a reproducible test device or standard which permits a meaningful comparison of the results on the performance of bone conduction receivers. In the illustrative embodiment of FIGURES 1, 3, and 4, the invention comprises a central disk 10 having small mass such that it is representative of the mass of the section of skin and bone—identified in FIGURE 2 as the inductor $m$—vibrated by the bone conduction receiver when the latter is operatively positioned against the mastoid area. To this end, it has been found advantageous to utilize a central disk 10 formed of magnesium and having a mass in the order of two grams or less. The upper surface 12 of the central disk 10 advantageously is contoured—a convex contour can be seen in the cross-sectional view of FIGURE 4—to make contact with the concave contour normally provided in a bone conduction receiver 14, as shown in broken line form in FIGURES 1 and 4. The contact between the bone conduction receiver and the central disk may be a point contact, a surface mating contact, or any intermediate type of contact sufficient to enable the disk to follow the vibrations of the receiver.

The central disk 10 is supported for vibration by the bone conduction receiver 14 by means of a plurality of beams 16 secured to the support ring 18. In this particular illustrative embodiment of the invention, the beams 16 and the ring 18 are formed of low mass material, such as magnesium, and the beams 16 are equally spaced 120° apart. In accordance with the invention, the beams 16 are compliant elements which represent the compliance or springiness of the skin—identified in FIGURE 2 as the capacitor $1/k$—against which the bone conduction receiver normally is applied.

The disk assembly 20, comprising the central disk 10, the beams 16 and the ring 18, is supportingly mounted on a piston block 22, which advantageously may be formed of stainless steel or the like. To this end, the ring 18 is formed with suitably spaced openings 24 through which the fastening screws 26 are inserted and threaded into the piston block 22.

Advantageously, the piston block 22 is provided with a central recess 28 into which a piston 30 is press-fitted. Preferably, the piston 30 is formed of the same low mass material as the central disk 12, as for example, magnesium.

As clearly shown in FIGURE 4 of the drawing, the disk assembly 20 is positioned on the piston block 22 such that the lower surface of the central disk 10 is spaced from the upper surface of piston 30 to define a disk-like air space 32 therebetween. The air space 32 between the central disk 10 and piston 30 forms an acoustic cavity which in combination with the annular air space 74, defined by the cylindrical flange 72 depending from disk 10 and the side walls of the piston 30, serves to damp the vibrations of the central disk, as explained in greater detail hereinbelow, and the damping losses thus provided are representative of the viscous damping losses which occur in the skin—identified as the resistance r in the equivalent circuit of FIGURE 2. Further, the relatively large mass of the piston block 22 is representative of the equivalent skull mass seen by the bone conduction receiver—identified as the inductor M shown in the equivalent circuit of FIGURE 2.

The piston block 22 is supported in position by means of the resilient leaf spring 34 secured at one end thereof to the piston block 22 by means of the threaded screw 36 and spacer element 38, and secured at the other end thereof by the threaded screw 40 inserted through the spacer element 42 into the support post 44. In the illustrative embodiment shown in FIGURES 1, 3, and 4, three 120° spaced apart leaf springs 34 and support posts 44 are provided for the piston block 22, with the support posts 44 being secured in position by the screw fasteners 46 to the cylindrical base 48.

A force measuring device, such as an accelerometer 50, is threadedly secured to the bottom of the piston block 22 and is operative upon vibration of the invention by the bone conduction receiver 14 to generate electrical signals representative of the vibratory force imparted to the accelerometer. Those skilled in the art will readily appreciate that the electrical signal output of the accelerometer 50 may be applied, through any suitable impedance matching device, to an amplifier 52 and an indicator 54, to produce a record of the performance characteristics of the bone conduction receiver 14.

While the bone conduction receiver 14 may be applied to the central disk 10 by any suitable means, advantageously, the support leg 56 may be utilized for this purpose. Support leg 56 is secured to the cylindrical base 48 as by the threaded fasteners 80, and has the clamping plates 58 and 60 positioned thereon. Sandwiched between clamping plates 58 and 60 is a spacer member 82 and one end of a vibrator support leaf spring 62. The other end of the vibrator support leaf spring 62 is provided with a suitable U-shaped clamp 64 within which the bone conduction receiver 14 to be tested may be pivotally mounted.

It can be seen that the resilient action of the vibrator support leaf spring 62 serves to firmly hold the bone conduction receiver vibrator 14 against the central disk 10 in much the same manner that a bone conduction receiver is urged against the skin of a hard-of-hearing person. If desired, further damping action may be provided with respect to the vibrator support leaf spring 62 and the piston block supporting leaf springs 34 by a layer of viscoelastic damping material 66 positioned thereon, which in turn, has positioned thereon a layer of aluminum foil 68.

The operation of the invention will now be described in greater detail. In the particular illustrative embodiment shown in FIGURE 4 of the drawing, the piston 30 is essentially cup-shaped and is provided with an outer annular groove 70. In addition, in this particular illustrative embodiment of the invention, the lower surface of the central disk 10 has depending therefrom a cylindrical flange 72 which is adapted to be positioned in the annular groove 70 in spaced relation to the piston 30 such that an annular air space 74 is provided between the cylindrical flange 72 and the piston 30.

When the central disk 10 is vibrated up and down by the bone conduction receiver 14, the air which is trapped between the disk and the piston is alternately compressed and expanded. Thus, when the disk 10 moves downwardly, the air molecules move radially outwardly in the disk-like air space 32 and the molecules of air are forced out of the annular air space 74. When the disk 10 moves upwardly, to return to its original position, a negative pressure is created in the air spaces so that the air molecules return thereto. Those skilled in the art will appreciate that the motion of the air molecules, as described above, provides an air damping action, and in accordance with a feature of this invention, this air damping action is representative of the viscous damping loss, r, which occurs in the skin against which the bone conduction receiver is applied.

Since the viscosity of air changes negligibly over a wide temperature range, the air damping action is a very stable one. It further will be appreciated by those skilled in the art that in lieu of the air damping described above, other fluids can be used to provide higher damping, but in the use of such other fluids, some compensation for viscosity changes should be provided.

The primary function of the annular air space 74 is dissipation. With respect to the disk-like air space 32, the volume of air enclosed in this space is of importance in selecting the upper frequency limit to which the invention is to be operated. Thus, the higher the frequency limit of operation, the smaller the volume of disk-like air space 32.

In one practical embodiment of the invention, the measurements were made in the 125–4,000 cycle range as this is one frequency range within which the bone conduction receiver advantageously may be adapted to be operated. The volume of the disk-like air space 32 was adjusted accordingly since if the volume of air was too large, effective damping of the disk 10 would be inhibited as the air in this space would be compressed and would not move through the annular air space 74. The volume of air in the disk-like air space 32 should be kept small for the frequency range of operation utilized with a bone conduction hearing aid receiver.

It also is important, as set forth above, that the material forming the piston 30 should have a co-efficient of temperature expansion similar to that of the material forming the central disk 10, and to this end, both elements are formed of magnesium in a preferred embodiment of the invention. Accordingly, it now can be seen that the invention provides the necessary mass $m$, compliance $1/k$, and damping $r$, to accurately simulate the effective impedance seen by a bone conduction receiver when applied to the head of a hard-of-hearing person.

Inductor M, shown in the equivalent circuit diagram of FIGURE 2, is represented by the relatively large mass of the piston block 22. The resistor R, shown in FIGURE 2 is not represented in the illustrative embodiment of FIGURE 1, but it would be present if the height of the base 48 were increased to be adjacent piston block 22, so as to define an annular air space therebetween. However, it has been found that the R component may be ignored for all practical purposes in any measurements using frequencies in the order of 125 cycles per second or more and, at these frequencies, M may substantially be reduced from the true value of the equivalent skull mass.

It now can be appreciated that the force measured by the accelerometer 50 is not the force applied by a bone conduction receiver 14, but rather, it is the force which gets through to the skull if the bone conduction receiver 14 were operatively positioned upon the head of a hard-of-hearing person.

In other words, the force that gets through to the accelerometer 50, and which therefore is measured and indicated, differs from the force applied to the invention by the bone conduction receiver 14 by an amount equal to the force required to accelerate the small mass 10 and the effective dynamic mass of the compliant support beams 16 with the viscous damping loss and compliance of the skin taken into full consideration.

In the above-described illustrative embodiment, the viscous damping losses which occur in the skin—identified as the resistance r in the equivalent circuit of FIGURE 2—are developed by the acoustic cavity formed between the central disk 10 and the piston 30 together with the annular air space 74 defined by the cylindrical flange 72, depending from the central disk 10, and the side walls of piston 30.

In another embodiment of the invention, the skin viscous damping is developed by the air damping space divided between a central disk having no cylindrical flange depending therefrom and the upper surface of the piston. Thus, as illustrated in FIGURE 5 of the drawing, a central disk 90 adapted to be vibrated by a bone conduction receiver is supported by means of a plurality of compliant beams 16 secured to the support ring 18. The central disk 90 is similar to the central disk 10, described hereinbelow, in that it is provided with a contoured upper surface 92 shaped to receive a mating surface of a bone conduction receiver, and in that it advantageously is formed of a low mass metal, such as magnesium. The central disk 90 differs from the previously described central disk 10 in that is is formed with a generally flat lower surface 94 and has no cylindrical flange depending therefrom.

The central disk assembly, including the disk 90, the compliant beams 16, and the support ring 18, is supportingly mounted on the piston block 22, as by means of the threaded fasteners 26 inserted through the apertures 24 in the support ring. The piston block 22 is provided with a central cylindrical recess 96 into which the cup-shaped piston 98 is adapted to be placed, such as by a press-fit.

In accordance with a feature of this invention, the piston 98 is formed of the same low mass metal, such as magnesium, as the central disk 90 to the end that these two elements have a similar co-efficient of temperature expansion.

In providing the necessary air damping action during the operation of the invention, as when a bone conduction receiver is operatively mounted on the upper surface 92 of the central disk 90, the vibration of the disk 90 relative to the piston 98 forces the air molecules in the air damping space therebetween to move radially. Thus the friction of the air molecules moving radially between the central disk and the piston provides the air damping loss which is representative of the viscous damping loss that exists when the bone conduction receiver is operatively positioned against the skin of a hard-of-hearing person.

For the reasons set forth above, the volume of air in the air damping space between the disk 90 and the piston 98 should be kept small for the frequency range of operation utilized with a bone conduction receiver so that effective damping of the disk 90 is provided.

In the above-described embodiments of the invention, the skin compliance—identified as $1/k$ in the equivalent circuit of FIGURE 2—is developed by the compliant beams 16 which support the central disk.

In another embodiment of the invention, this skin compliance could be developed by extending the beams 16 to form a single solid disk of relatively large diameter. This further embodiment of the invention is illustrated in FIGURE 6 of the drawing which shows a generally flat, circular magnesium disk 100 having its outer edges secured or clamped to the support ring 18. The upper central portion 102 of the enlarged disk 100 is shaped to mate with a bone conduction receiver.

In this embodiment, the springiness of the disk 100 serves as the required compliance factor. Thus, those skilled in the art will readily appreciate that by substituting the magnesium disk 100 for the magnesium beams 16, a single solid disk having the desired mass and compliance characteristics is provided to be vibrated by the bone conduction receiver 14.

In this embodiment, a modified piston advantageously may be utilized, and as shown in FIGURE 6 of the drawing, this modified piston may comprise a thin, flat disk 104 of magnesium positioned in the piston block 22. Advantageously, the thin, flat piston 104 may be formed with substantially the same radial dimensions as the magnesium disk 100, and the necessary air damping is provided by the action of the air molecules which are moved radially in the air space between disk 100 and piston 104 in response to the vibration of the disk 100 when the bone conduction receiver is operatively positioned thereon.

A still further illustrative embodiment of the invention which utilizes magnetic damping to develop viscous damping loss of the skin is shown in FIGURE 7 of the drawing. In this embodiment, the central disk 106 is formed with a contoured upper surface 108 shaped to mate with a bone conduction receiver and is supportingly mounted by means of the compliant beams 16 to the outer support ring 18. The lower surface of the central disk 106 is provided with a cylindrical flange 110 which may have a coil of electrical conductors 112 wound therearound.

The piston block 22 is provided with a central cylindrical recess 114 within which the magnet assembly 116 may be press-fitted. Magnet assembly 116 comprises a center post 118, which advantageously may be a permanent magnet having a pair of poles at each end thereof. In addition to the center post 118, the magnet assembly 116 comprises a cylindrical pole piece 120 which encircles center post 118 and which is spaced from post 118 to define an annular groove therebetween.

As shown in FIGURE 7 of the drawing, the cylindrical flange 110 of the central disk 106 is adapted to be positioned within the annular groove to the end that the central disk 106 and flange 110 are vibrated up and down in response to the vibration of a bone conduction receiver operatively positioned upon surface 108 of the central disk 106.

In this embodiment of the invention, magnetic damping of the vibrations is provided by the movement of the central disk 106, flange 110, and conductors 112 in the constant magnetic field created by the permanent magnet 118 and pole piece 120. Manifestly, those skilled in the art will readily appreciate that the damping action provided by the movement of the conductive material in the magnetic field serves to damp the vibrations given to the central disk assembly by the bone conduction receiver.

It further is contemplated that the magnetic damping action described above also may be achieved by the movement of the conductive central disk assembly in the constant magnetic field and that the electrical conductors 112 may be eliminated, if desired, It further will be appreciated that in lieu of the specific illustrative construction shown in FIGURE 7 of the drawing, the cylindrical pole piece 116 may have a permanent magnet substituted therefor and that the center post 118 then may take the form of a pole piece.

It further is contemplated that the damping action described above with respect to the various illustrative embodiments shown in FIGURES 1, 4, 5, 6, and 7 may be made adjustable by means of a fluid port in the piston and piston block assembly through which the air molecules may be permitted to escape during vibration of the central disk. To this end, any suitable valve for opening or closing the port may be provided to thereby enable the damping effect to be adjusted as desired.

In addition to the air and magnetic damping action described above, those skilled in the art will also appreciate that other fluids may be used in lieu of air, as for example, water, oil and the like. Use of such other fluids will provide a higher degree of damping, but the factor of viscosity change with temperature must be taken into consideration with their use. Thus, one can achieve higher damping with fluids other than air, but the problem of viscosity changes with temperature renders the use of air damping preferable due to the stability of air over the wide temperature range.

The testing and measuring of different bone conduction receivers by the invention may be facilitated by pivotally mounting the receiver support leaf spring 62. To this end, as illustrated in FIGURE 4 of the drawing, the clamping member 58 may be hingedly secured to the support leg 56, as by the hinge 122 to permit the entire support assembly to be rotated upwardly for replacement of the receiver in the U-shaped clamp 64. When the receiver is operatively positioned against the central disk the entire support assembly is maintained in position by means of the bolt 124 inserted through the support leg 56 and locked thereto by the wing nut 126.

A further embodiment of the invention is illustrated in FIGURE 8 of the drawing wherein a relatively heavy support beam 128, preferably of metal and of rectangular form, is shown as supporting the disk assembly 20 which comprises the central disk 10, the radial beams 16 and the ring 18. In this construction, the disk assembly 20 rests on a piston member 130 which preferably is entirely formed of magnesium or some similar low mass metal. The piston member 130 is secured at its lower central portion to the support beam 128, as by a force fit or by a suitable fastener such as the threaded bolt 132. The bolt 132 also secures a strain gauge 134 to the lower surface of beam 128 to measure the beam deflection caused by the vibration of the disk assembly 20 and piston member 130 and to provide an electrical current output corresponding to such deflection.

In this embodiment, the beam 128 is an element of great stiffness and low compliance which is substituted for the terms R and M described heretofore. In the use of the FIGURE 8 embodiment, the resulting errors over the range of frequencies from 125 cycles to 4,000 cycles is kept at a minimum and therefore is negligible. The piston member 130 in this embodiment serves merely as an adapter to the beam, and therefore the entire member should be kept as light as possible.

While there has been shown and described several illustrative embodiments of the present invention, it will of course, be understood that various modifications and alternative constructions may be made without departing from the true spirit and scope of the invention. Therefore, it is intended to cover by the appended claims all such modifications and alternative constructions as fall within their true spirit and scope.

What is claimed as the invention is:

1. An artificial mastoid for measuring and testing the performance characteristics of bone conduction hearing aid devices comprising a low mass metal disk having a contoured surface adapted to receive a vibratable bone conduction receiver, a resiliently mounted piston block having a piston formed of said low mass metal, compliant means supportingly mounting said disk for vibration on said piston block such that said disk and said piston are spaced from each other to define a fluid damping space therebetween whereby vibration of said disk by said bone conduction receiver causes said piston block to vibrate in a manner determined by the mass of said disk, the mass of said piston block, the compliance of said compliant means, and the damping action at said fluid damping space, and force measuring apparatus secured to said piston block for generating electrical signals representative of the force imparted to said force measuring apparatus by the vibratory action of said piston block.

2. An artificial mastoid in accordance with claim 1 wherein said force measuring apparatus comprises an accelerometer and further comprising amplifying and indicating means connected to said accelerometer to provide indications of the performance characteristics of said bone conduction receiver in accordance with said electrical signals.

3. An artificial mastoid for measuring and testing the performance characteristics of bone conduction hearing aid devices comprising a magnesium disk having a surface shaped to receive a vibratable bone conduction receiver, a resiliently mounted support block having a magnesium piston, compliant beam means supportingly mounting said disk for vibration on said support block such that said disk and said piston are spaced from each other to define an air damping space therebetween, and force measuring apparatus secured to said support block for generating electrical signals representative of the force imparted to said force measuring apparatus by the vibratory action of said support block.

4. An artificial mastoid for measuring and testing the performance characteristics of bone conduction hearing aid devices comprising a low mass metal disk having a surface shaped to receive a vibratable bone conduction receiver, a cylindrical flange depending from said disk, a resiliently mounted support block having a piston formed of said low mass metal, said piston having an annular groove formed therearound adapted to receive said cylindrical flange, compliant means mounting said disk for vibration on said support block such that said disk, said flange and said piston define a fluid damping space therebetween, and force measuring apparatus secured to said support block for generating electrical signals representative of the force imparted to said force measuring apparatus by the vibratory action of said support block.

5. An artificial mastoid in accordance with claim 4 wherein said force measuring apparatus comprises an accelerometer.

6. A reproducible standard for measuring and testing the performance characteristics of a bone conduction hearing aid receiver comprising a central disk formed of magnesium, said disk being shaped at one surface thereof to receive a bone conduction hearing aid receiver, a piston block, compliant means supportingly mounting said central disk in spaced relation to said piston block to define a fluid damping space between said central disk and said piston block, a rigid base member, resilient means supportingly mounting said piston block on said rigid base member, force measuring apparatus secured to said piston block operative to generate electrical signals representative of the vibratory force at said force measuring apparatus, and indicating means electrically connected to said force measuring apparatus for producing indications in response to said generated electrical signals.

7. A reproducible standard for measuring and testing the performance characteristics of bone conduction devices comprising a central disk, said disk being shaped at one surface thereof to receive a bone conduction receiver, a piston block, means supportingly mounting said central disk in spaced relation to said piston block to define a fluid damping space between said central disk and said piston block, a rigid base member, resilient means supportingly mounting said piston block on said rigid base member, force measuring apparatus secured to said piston block operative to generate electrical signals representative of the vibratory force at said force measuring apparatus, and indicating means electrically connected to said force measuring apparatus for producing indications in response to said generated electrical signals.

8. A reproducible standard for measuring and testing the performance characteristics of bone conduction devices comprising a central disk, said disk being shaped to receive a bone conduction receiver, a piston block, means supportingly mounting said central disk in spaced relation to said piston block to define a fluid damping space between said central disk and said piston block, accelerometer apparatus secured to said piston block operative to generate electrical signals representative of the vibratory force at said piston block, and indicating means electrically connected to said accelerometer apparatus for producing indications in response to said generated electrical signals.

9. A reproducible standard for measuring and testing the performance characteristics of bone conduction devices comprising a central disk, said disk being shaped to receive a bone conduction receiver, an annular flange depending from said central disk, a piston block, means supportingly mounting said central disk in spaced relation to said piston block to define a fluid damping space between said annular flange and said piston block, accelerometer apparatus secured to said piston block operative to generate electrical signals representative of the vibratory force at said accelerometer apparatus, and indicating means electrically connected to said accelerometer apparatus for producing indications in response to said generated electrical signals.

10. A reproducible standard for measuring and testing the performance characteristics of bone conduction devices comprising a magnesium disk, said disk being shaped to receive a bone conduction receiver, a magnesium ring, a plurality of magnesium beams supporting said disk for vibration in said ring in accordance with the vibrations of said receiver, a magnesium piston, a piston block supportingly receiving said piston, means mounting said disk on said piston block to define a fluid damping space between said disk and said piston, a rigid base member, resilient means supportingly mounting said piston block on said rigid base member, and force measuring apparatus secured to said piston block operative to generate electrical signals representative of the vibratory force at said force measuring apparatus.

11. A reproducible standard in accordance with claim 10 further comprising an annular flange depending from said disk to enclose said magnesium piston, said annular flange and said piston defining an annular fluid damping space therebetween.

12. A reproducible standard for measuring and testing the performance characteristics of bone conduction devices comprising a magnesium disk, said disk being shaped to receive a bone conduction receiver, a piston block, a magnesium piston of substantially the same diameter, a said magnesium disk secured to said piston block, means mounting said disk in spaced relation to said piston to define a fluid damping space therebetween, a rigid base member, resilient means supportingly mounting said piston block on said rigid base member, and force measuring apparatus secured to said piston block operative to generate electrical signals representative of the vibratory force at said force measuring apparatus.

13. A reproducible standard for measuring and testing the performance characteristics of bone conduction devices comprising a vibratable conductive member, said member being shaped to receive a bone conduction receiver, an annular conductive flange depending from said conducitve member, a piston block, a magnet member mounted in said piston block comprising an annular groove between its poles adapted to receive said annular flange, means supportingly mounting said conductive member on said piston block for vibrating said conductive flange in said groove in accordance with the vibrations of said conductive member by the bone conduction receiver to provide magnetic damping thereof, resilient means supportingly mounting said piston block on said rigid base member, force measuring apparatus secured to said piston block operative to generate electrical signals representative of the vibratory force at said force measuring apparatus, and indicating means electrically connected to said force measuring apparatus for producing indications in response to said generated electrical signals.

14. A reproducible standard in accordance with claim 13 further comprising electrically energizable conductor means wound around said conductive flange for enhancing the magnetic damping of the conductive member vibrations.

15. Apparatus for measuring and testing the performance characteristics of a vibratable bone conduction receiver comprising a magnesium disk having a surface shaped to receive a vibratable bone conduction receiver, said disk having a mass representative of the mass of skin and bone against which the bone conduction receiver would be vibrated during the normal use thereof, resilient support means securing said disk in position to vibrate in response to the vibration of said bone conduction receiver, the resilience of said support means being representative of the compliance of the skin against which the bone conduction receiver would be positioned during normal use thereof, a magnesium piston positioned adjacent a second surface of said magnesium disk and spaced therefrom to define an air damping space therebetween, said air damping space serving to damp the vibrations of said disk to represent the viscous damping loss in the skin against which the bone conduction receiver is positioned during normal use thereof, a support block for said magnesium piston having a mass representative of the skull mass normally presented to the bone conduction receiver, and force measuring apparatus secured to said support block for generating electrical signals representative of the characteristics of the bone conduction receiver when applied to the head of the hard-of-hearing person.

16. Apparatus for measuring and testing the performance characteristics of a vibratable bone conduction receiver comprising a magnesium disk having a surface shaped to receive a vibratable bone conduction receiver, said disk having a mass representative of the mass of skin and bone against which the bone conduction receiver would be vibrated during the normal use thereof, resilient support means securing said disk in position to vibrate in response to the vibration of said bone conduction receiver, the resilience of said support means being representative of the compliance of the skin against which the bone conduction receiver would be positioned during normal use thereof, a magnesium piston positioned adjacent a second surface of said magnesium disk and spaced therefrom to define an air damping space therebetween, said air damping space serving to damp the vibrations of said disk to represent the viscous damping loss in the skin against which the bone conduction receiver is positioned during normal use thereof, and force measuring apparatus associated with said magnesium piston for generating electrical signals representative of the characteristics of the bone conduction receiver when applied to the head of the hard-of-hearing person.

17. Apparatus for measuring and testing the performance characteristics of a vibratable bone conduction receiver comprising a metallic disk having a surface shaped to receive a vibratable bone conduction receiver, said disk having a means representative of the mass of skin and bone against which the bone conduction receiver would be vibrated during the normal use thereof, resilient support means securing said disk in position to vibrate in response to the vibration of said bone conduction receiver, the resilience of said support means being representative of the compliance of the skin against which the bone conduction receiver would be positioned during normal use thereof, a metallic piston positioned adjacent a second surface of said disk and spaced therefrom to define an air damping space therebetween, said air damping space serving to damp the vibrations of said disk to represent the viscous damping loss in the skin against which the bone conduction receiver is positioned during normal use thereof, a support block for said piston having a mass representative of the skull mass normally presented to the bone conduction receiver, and force measuring apparatus secured to said support block for generating electrical signals representative of the characteristics of the bone conduction receiver when applied to the head of the hard-of-hearing person.

References Cited in the file of this patent
UNITED STATES PATENTS 2,249,131     Hartmann et al. _____ July 15, 1941